United States Patent
Ho

(10) Patent No.: US 7,059,208 B2
(45) Date of Patent: Jun. 13, 2006

(54) GEARBOX IN ALL TERRAIN VEHICLE POWER UNIT

(75) Inventor: Chao-Chang Ho, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 211 days.

(21) Appl. No.: 10/862,335

(22) Filed: Jun. 8, 2004

(65) Prior Publication Data

US 2005/0268745 A1    Dec. 8, 2005

(51) Int. Cl.
*F16H 3/08* (2006.01)
*F16H 57/02* (2006.01)
*F02B 75/32* (2006.01)

(52) U.S. Cl. .................. 74/329; 74/606 R; 123/197.1

(58) Field of Classification Search .............. 74/329, 74/606 R; 123/197.1, 195 C, 198 E, 198 P
See application file for complete search history.

(56) References Cited

U.S. PATENT DOCUMENTS

| 1,936,350 | A | * | 11/1933 | Davis | 123/195 R |
| 1,999,374 | A | * | 4/1935 | Pavlecka | 123/54.2 |
| 3,550,474 | A | * | 12/1970 | Maurice et al. | 74/606 R |
| 3,857,378 | A | * | 12/1974 | Nakamura | 123/196 R |
| 6,941,918 | B1 | * | 9/2005 | Laimboeck | 123/195 R |
| 2002/0005191 | A1 | * | 1/2002 | Maeda et al. | 123/572 |

FOREIGN PATENT DOCUMENTS

| JP | 355106824 A | * | 8/1980 | 123/197.1 |
| JP | 360042657 A | * | 3/1985 | |

* cited by examiner

*Primary Examiner*—Roger Pang
(74) *Attorney, Agent, or Firm*—Leong C. Lei

(57) ABSTRACT

A gearbox permits easy assembly, simple structure, reduced number of parts required, and facilitated service of chains and sprockets in an automobile power unit; having a worm provided as one end of the main shaft in the gearbox to protrude out of the bearing; whereby a space being defined on the gearbox to accommodate a active lever provided with gear tooth to mate the worm, another end of the active lever coupled to tachometer wire to transmit rpm of gears in the gearbox to the tachometer.

3 Claims, 4 Drawing Sheets

GEARBOX IN ALL TERRAIN VEHICLE POWER UNIT

BACKGROUND OF THE INVENTION (a) Technical Field of the Invention

The present invention is related to a gearbox in all terrain vehicle power unit, and more particularly, to one that has a worm and an active lever mounted on the gearbox to transmit rpm of the transmission gear to a tachometer.

(b) Description of the Prior Art

Referring to FIG. 1 of the accompanying drawings, a belt transmission 2 in an automobile power unit of the prior art is accommodated in a gear box 11, and power generated from an engine 12 passes through a crankshaft 13 in a crankshaft case 15 to drive the belt transmission 2. The belt transmission 2 contains a slide disk 21 disposed on the crankshaft 13, a drive disk 22 provided on the crankshaft 13 and located to one side of the slide disk 21, an inclined plate 23 provided on the crankshaft 13 and located to the other side of the slide disk 21, a ball bearing 24 restricted in where between the slide disk 21 and the inclined plate 23, a passive shaft 25 linked to the belt transmission 2, two passive disks disposed on the passive shaft 25, a clutch 27 fixed to the passive shaft 25, a transmission belt 28 and a bearing 29 mounted on a cover 111 of the gearbox 11 to support the passive shaft 22. Wherein, the slide disk 21 and the drive disk 22 define an active disk for the belt transmission 2. One end of the transmission belt 28 is located at where between the driver disk 22 and the slide disk 21; and the other end, between those two passive disks 26.

Power generated from the explosion in the combustion chamber of an engine 12 pushes a piston 14 to engage in reciprocal movement to drive the crankshaft to rotate and both of the slide disk 21 and the drive disk 22 rotate synchronously; meanwhile, the ball bearing 24 travels when subject to eccentric force. As a throttle opens wider, the rpm of the crankshaft 13 increases to subject the ball bearing 24 to higher eccentric force; the ball bearing 24 starts to travel outwardly to hold against the slide disk 21; in turn, the slide disk 21 moves toward the driver disk 22 to narrow down the distance between the drive disk 22 and the slide disk 21, forcing the transmission belt 28 to expand for increased the coverage of the revolving circumference of the transmission belt 28 and further to increase the rpm of both passive disks 26 and accelerate the rear wheels (not illustrated) as driven by the gearbox 3 and the sprocket 37 with the power transmitted from the passive shaft 25 driven by the clutch 27. Consequently, the drive speed of the automobile is increased.

On the contrary, when the throttle is released, the eccentric force applied on the ball bearing 24 is reduced, and the distance between the drive disk 22 and the slide disk 21 gets larger in conjunction with the squeeze from the transmission belt 28 to reduce the coverage of the circumferential revolving of the transmission belt 28. Therefore, the drive speed of the automobile is decreased since the rpm of both passive disks is slowed down and that transmitted to the rear wheels is also slowed down due to the reduced rpm of the passive shaft.

Now referring to FIG. 2, the gearbox for the power unit to execute gear shifting function is comprised of a gearshift rod 31, a gearshift hub 32, a forked guide 33, a main shaft 34, an inverse link shaft 35 and a final shaft 36 provided in sequence in the gearbox 3. Wherein, a gear 311 of the gearshift rod 31 is mated to a gear 222 of the gearshift hub 32, one end of a gearshift fork 331 inserted to the forked guide 33 is inserted to a rail of position slot on the gearshift hub 321 while the other end of the gearshift fork 331 is inserted to a slide 341 of the main shaft 34. During the operation, the gearshift rod 31 is pushed to drive the gearshift hub 321 to revolve, thus to force one end of the gearshift fork 331 to travel in the rail of the position slot of the gearshift hub 321 to the position slot desired while the other end of the gearshift fork 331 drives the slide 341 to travel on the main shaft to engage the forward gear 342 or the backward gear 343 for completing the purpose of shift of position. Meanwhile, the power from the belt transmission 2 is transmitted through the passive shaft 25 to the final shaft 36 in the gearbox 3.

As illustrated in FIG. 1, the final shaft 36 in the gearbox 3 extends out of the gearbox 3 and a sprocket 37 is disposed at one end of the final shaft 36. A cover 38 provided over the sprocket 37 is adapted with a worm 391 and an active lever 392 linked to the gear rpm in the gearbox 3. Another end of the active lever 392 is connected to a grip of a tachometer wire 4. Once the final shaft 36 revolves, both of the worm 391 and the active lever 392 are driven to revolve. The driver reads the mileage and car speed from the tachometer on the instrument panel as driven by the wire 4. Though the prior art achieves its purpose of informing the driver about the mileage and car speed, the installation and transmission of the tachometer wire 4 requires parts including a screw 393, a sleeve 394, a bearing 395 and another screw 396. Both of the worm 391 and the active lever 392 are provided externally to the cover 38 of the sprocket resulting in greater horizontal width of the gearbox at the cost of the layout space for the entire body of the automobile. Furthermore, to provide service on the sprockets and chains, all the wire 4, the cover 38, the screw 396 and the sleeve 394 must be removed one by one.

SUMMARY OF THE INVENTION

The primary purpose of the present invention is to provide a gearbox in an all terrain vehicle power unit that allows easy assembly, simple structure, reduced number of parts required and facilitated service of the chains and the sprocket. To achieve the purpose, one end of the main shaft in the gearbox is protruded out of the bearing in the form of a worm; thereby a space is defined on the case of the gearbox to accommodate the insertion of an active lever. One end of the active lever is provided with teeth to mate the worm while the other end of the active lever is coupled to a tachometer wire so to transmit the gear rpm in the gearbox to the through the worm and the active lever.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
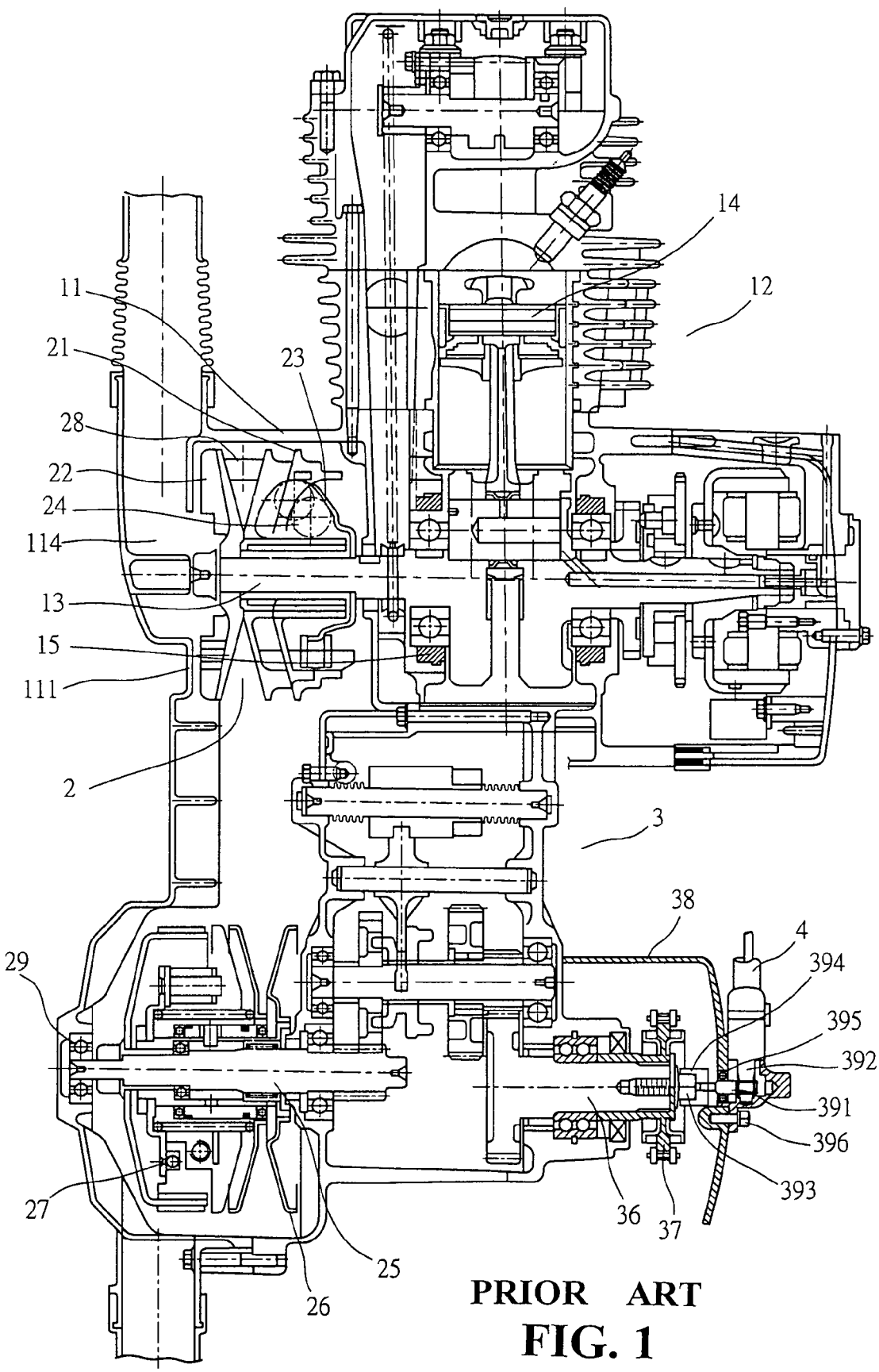
FIG. 1 is a schematic view showing a power unit of the prior art.
Figure 2:
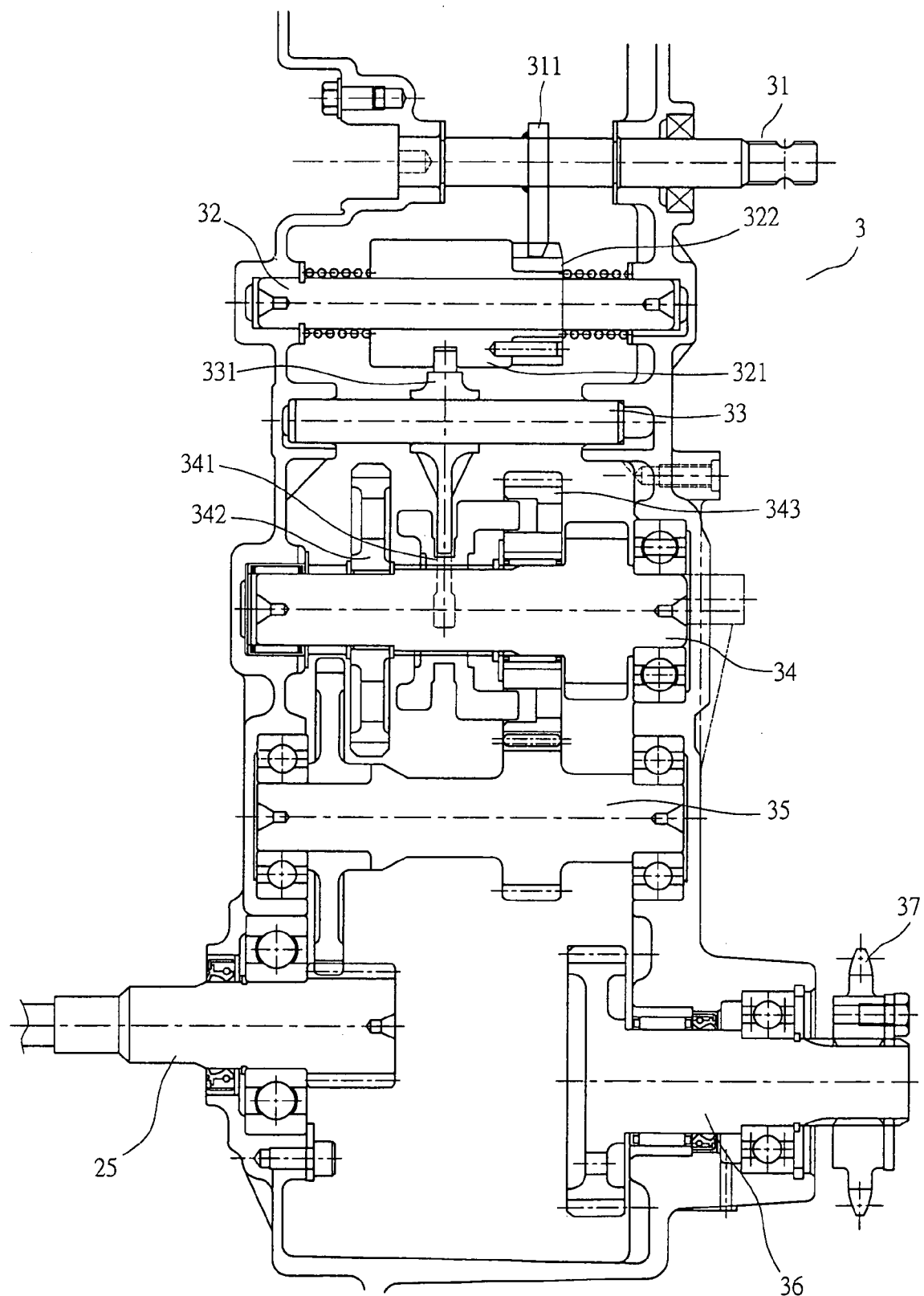
FIG. 2 is a schematic view showing a gearbox of the prior art.
Figure 3:
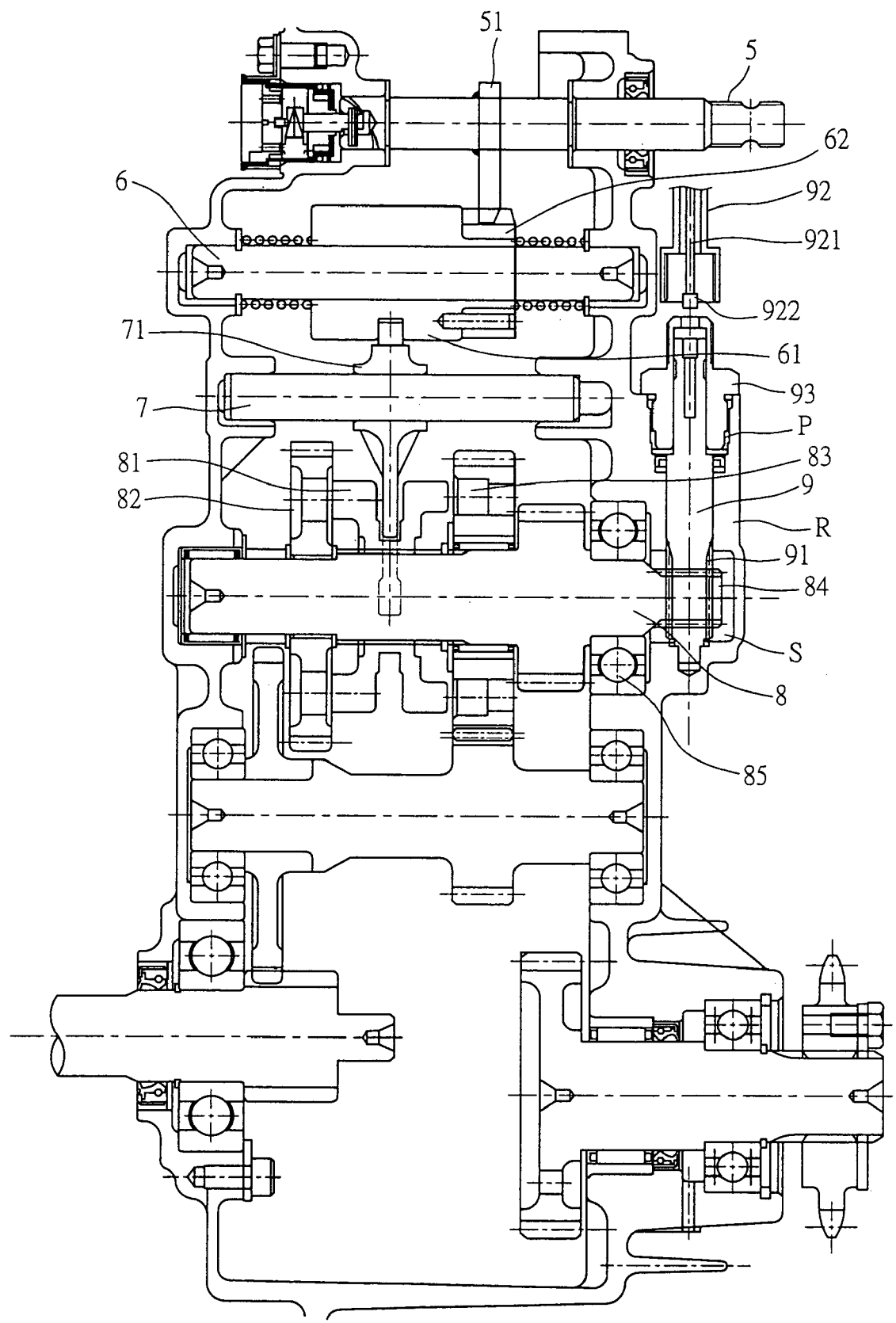
FIG. 3 is a schematic view showing a gearbox of a preferred embodiment of the present invention.
Figure 4:
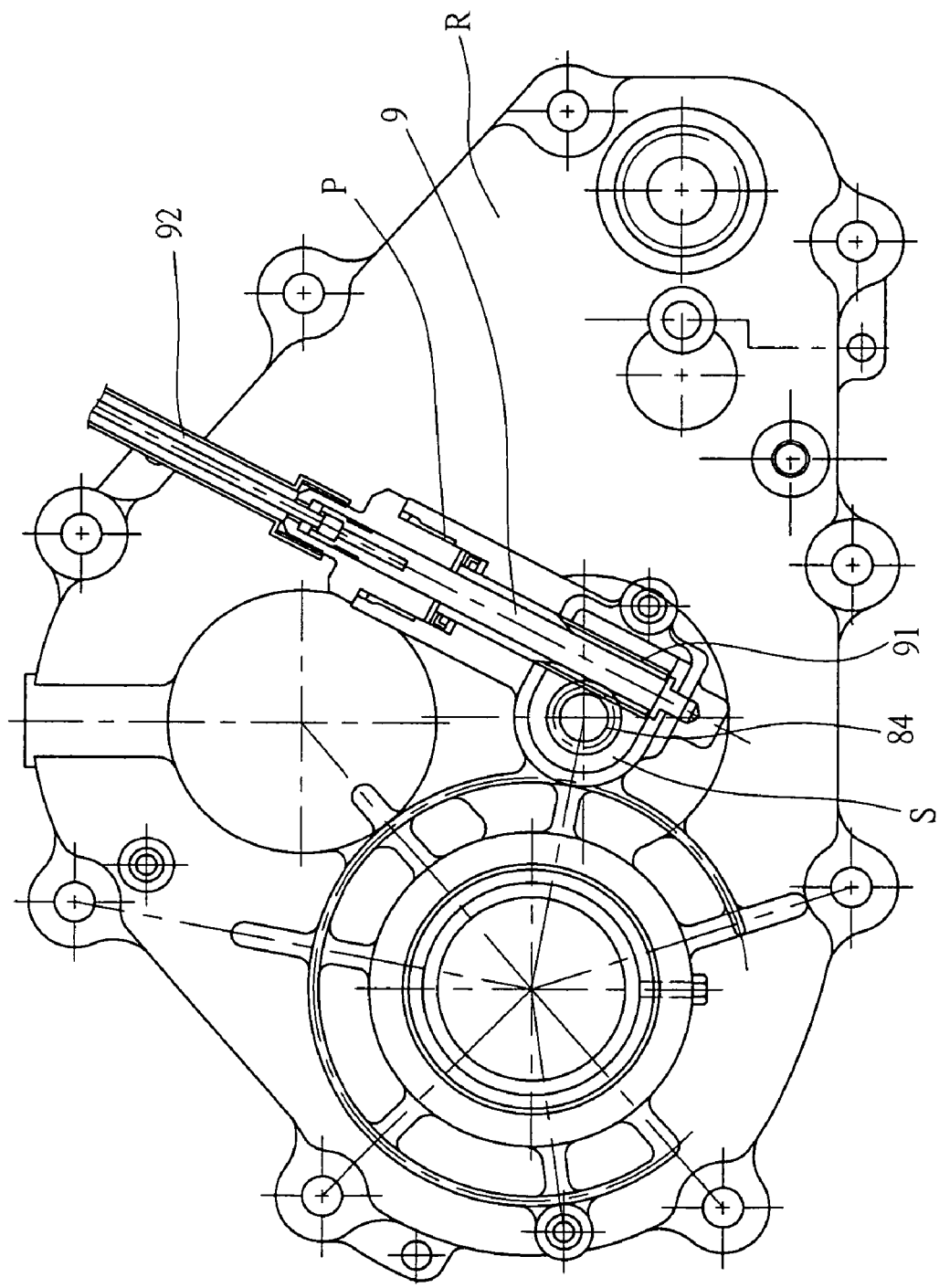
FIG. 4 is a side view of the preferred embodiment of the present invention.

The basic configuration of a power unit of the present invention is the same as that of the prior art, and will not be elaborated herein. Referring to FIGS. 3 and 4 for the construction of a gearbox of the present invention, the gearbox contains members including a gearshift rod 5, a gearshift hub 6, a forked guide 7 and a main shaft 8. Wherein, a gear 51 from the gearshift rod 5 is mated to another gear 62 from the gearshift hub 6; one end of a fork 71 inserted to the forked guide 7 is inserted to a rail on a position slot of the gearshift hub 61 and the other end of the fork 72 is inserted to a slide 81 of the main shaft 8. In operation, the gearshift rod 5 is pushed to drive the gearshift 61 to revolve so to force one end of the fork 71 to travel on the rail of the position slot of the gearshift hub 61 to the position slot as desired while the other end of the fork 71 drives the slide to travel on the main shaft 8 to mate a forward gear 82 or a backward gear 83 for achieving the purpose of shifting the gear position.

One end of the main shaft 8 in the gearbox is protruded out a bearing to form a worm 83 and define a space S on a gearbox case R. The space S has an opening P to receiver in position of an active lever 9. A worm tooth 91 is disposed at the end of the active lever 9 to mate a worm 84 from the main shaft 8 so that the active lever 9 revolves as driven by the main shaft 8. Another end of the active lever 9 is coupled to a tachometer wire 92 and the other end of the tachometer wire 92 is connected to a tachometer on the instrument panel (not illustrated). The tachometer wire 92 relates to a structure of the prior art and will not be elaborated herein. Since the active lever 9 has the tachometer wire 92 installed to the opening P on the gearbox case R by means of a hollow bolt 93, and one end of the core 921 of the tachometer wire 92 is made in the form of a square member 922 provided at an opening 94 on the active lever 9, the core 921 of the tachometer wire 92 is driven to revolve synchronously when the active lever 9 is driven to revolve for the tachometer wire 92 to drive the tachometer on the instrument panel.

Whereas the end of the main shaft 8 protruding out of the bearing 85 defines the worm 84, the accommodation space S is disposed on the gearbox case R; the opening P is provided in the accommodation space S to receive the insertion of the active lever 9 in position; and the active lever 9 is mated to the worm 84 by its worm tooth 91; the assembly of the present invention can be easily done and the accommodation space and the opening formed on the gearbox case allows simple structure, minimum number of parts required, lower production cost and easy access to the chains and sprocket for service purposes.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A gearbox in all terrain vehicle power unit with the power unit comprised of an engine for pistons to drive a crankshaft in a crankshaft case to revolve; a belt transmission accommodated in a transmission box to transmit the power from the engine to a passive shaft; and a gearbox to transmit the power to a main shaft and a final shaft by means of gear shift executed by a gearshift hub and a fork is characterized by that one end of the main shaft in the gearbox protruding out of a bearing to define a worm; the worm with its tooth mated to an active lever; another end of the active lever being connected to a grip of a tachometer wire to transmit rpm of the gear in the gearbox to the tachometer wire.

2. A gearbox in all terrain vehicle power unit as claimed in claim 1, wherein, a space is formed on a gearbox case at where the worm is protruded from the main shaft to accommodate the mating between the worm and the tooth of the active lever.

3. A gearbox in all terrain vehicle power unit as claimed in claim 1, wherein, an opening is provided to the accommodation space for insertion of the active lever.

* * * * *